US00RE34713E

United States Patent [19]

Itagaki et al.

[11] E Patent Number: Re. 34,713

[45] Reissued Date of Patent: Aug. 30, 1994

[54] VINYLAMINE COPOLYMER FLOCCULATING AGENT ETC.

[75] Inventors: Takaharu Itagaki, Yokohama; Mitsuaki Shiraga, Machida; Shigeru Sawayama, Yokohama; Kohichi Satoh, Zama, all of Japan

[73] Assignee: Mitsubishi Kasei Corporation, Tokyo, Japan

[21] Appl. No.: 946,530

[22] Filed: Sep. 16, 1992

Related U.S. Patent Documents

Reissue of:

[64] Patent No.: 4,957,977
Issued: Sep. 18, 1990
Appl. No.: 4,70,,395
Filed: Jan. 25, 1990

U.S. Applications:

[63] Continuation of Ser. No. 65,296, Jun. 22, 1987, abandoned.

[30] Foreign Application Priority Data

Jun. 25, 1986 [JP] Japan ..... 61-148680

[51] Int. Cl.[5] ..... C08F 8/12

[52] U.S. Cl. ..... 525/328.4; 525/328.2; 525/340; 525/343; 525/355; 526/307; 526/307.1

[58] Field of Search ..... 525/328.2, 328.4; 526/307, 307.1

[56] References Cited

U.S. PATENT DOCUMENTS

| | | | |
|---|---|---|---|
| 3,976,824 | 8/1976 | Ariyoshi et al. | 525/328.4 |
| 4,254,250 | 3/1981 | Glowaky et al. | 525/328.4 |
| 4,552,905 | 11/1985 | Keil et al. | 521/150 |
| 4,703,087 | 10/1987 | Lange et al. | 525/328.4 |
| 4,774,285 | 9/1988 | Pfohl et al. | 525/328.2 |
| 4,902,751 | 2/1990 | Lewellyn et al. | 525/328.4 |

OTHER PUBLICATIONS

Murao et al, Chemical Abstracts 106:5657m (Jan. 12, 1987), (citing JP 61-118,406 of Jun. 5, 1986).

*Primary Examiner*—Bernard Lipman
*Attorney, Agent, or Firm*—David G. Conlin; George W. Neuner

[57] ABSTRACT

[Disclosed herein is a vinylamine copolymer having the structural units represented by the following formulas (I), (II), (III), (IV) and (V):

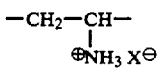

[I]

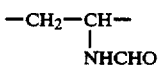

[II]

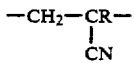

[III]

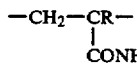

[IV]

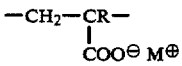

[V]

wherein $X^{\ominus}$represents an anion or hydroxyl ion, R represents a hydrogen atom or a methyl group, $M^{\oplus}$represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) is 0 to 40% by mole, all of said molar fractions being based on the vinylamine copolymer and the molar fraction of the structural unit (V) is 0 to 8% by mole which is based on the total content of the structural units (III), (IV) and (V), a flocculating agent and a paper strength increasing agent using the vinylamine copolymer, and a process for producing the vinylamine copolymer.]

*Disclosed herein is a vinylamine copolymer comprising structural units represented by the following formulas:*

(Abstract continued on next page.)

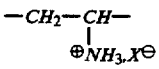

(A)

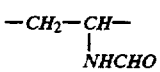

(B)

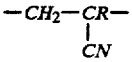

(C)

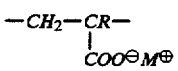

(D)

*wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit (D) is 0 to 20% by mole which is based on the total content of the structural units (C) and (D), wherein the total of the molar fractions of all structural units of the vinylamine copolymer is equal to 100%.*

31 Claims, No Drawings

VINYLAMINE COPOLYMER FLOCCULATING AGENT ETC.

Matter enclosed in heavy brackets [ ] appears in the original patent but forms no part of this reissue specification; matter printed in italics indicates the additions made by reissue.

This is a continuation of copending application(s) Ser. No. 07/065,296 filed on June 22, 1987 now abandoned.

BACKGROUND OF THE INVENTION

This invention relates to a novel vinylamine copolymer, a flocculating agent for the treatment of waste water using the vinylamine copolymer and a paper strength increasing agent using the vinylamine copolymer in the paper making industry, as well as a process for producing the vinylamine copolymer. More particularly, the present invention relates to a vinylamine copolymer having structural units represented by the following formulas (I), (II), (III)[,] (IV) [and (V)]:

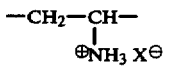
[I]

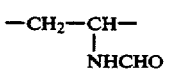
[II]

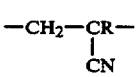
[III]

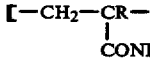
[IV]]

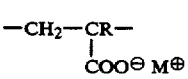
[[V]][*IV*]

wherein $X^{\ominus}$ represents an anion or hydroxyl ion, R represents a hydrogen atom or a methyl group, $M^{\oplus}$ represents a hydrogen ion or a monovalent cation), in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 8% by mole which is based on the total content of the structural units (III)[,] *and* (IV) [and (V)], a flocculating agent for the treatment of waste water and a paper strength increasing agent using the vinylamine copolymer in the papermaking industry, as well as a process for producing the vinylamine copolymer, a flocculating agent using the vinylamine copolymer, a paper strength increasing agent using the vinylamine copolymer and a process for producing the vinylamine copolymer.

The novel vinylamine copolymer according to the present invention exhibits excellent effects in the field of application of cationic polymers such as flocculating agents for use in the treatment of waste water, dehydrating agents for organic sludges, drainage aids, retention aids, paper strength increasing agents, etc. in the papermaking industry.

For the preparation of the polyvinylamine, a method by Hofmann reaction of polyacrylamide and hydrolysis of poly-N-vinylamide has been known. Particularly, the method of hydrolysis of a homopolymer of N-vinylformamide is an excellent method which is capable of synthesizing a polyvinylamine of high molecular weight with high stability. However, the resultant polymer is extremely hydrophilic and has only an insufficient effect in the case of using it as a flocculating agent for dehydration. For providing a polyvinylamine with hydrophobic properties, a method of copolymerizing N-vinylformamide and ethylene and then hydrolyzing the resulting product has been known. However, it was difficult to solve the problem by use of the copolymer of N-vinyl formamide and ethylene, since copolymerizability between N-vinylformamide and ethylene is not favorable and, in addition, it is difficult to obtain a copolymer of high-molecular weight.

The present inventors had previously proposed a method of preparing a flocculating agent with good dehydrating properties by copolymerizing N-vinylamide with acrylonitrile, followed by hydrolysis thereby modifying not less than 10 mol % of nitrile groups into carboxyl groups [refer to Japanese Patent Application Laid Open (KOKAI) No. 59-39399(1984)]. Although the effect was remarkable for N-vinylacetamide copolymer shown in the examples, there has been a problem for N-vinylformamide copolymer in that the dehydrating property is remarkably reduced in the case where not less than 10 mol % of the nitrile groups are modified into carboxyl groups. As a result of a further study, the present inventors had proposed a process for producing a flocculating agent by using a basic hydrolyzate of a copolymer of N-vinylformamide and (metha)acrylonitrile [refer to Japanese Patent Application Laid Open (KOKAI) No. 61-118406(1986)]. However, the proposed hydrolyzate still involves a problem in that most of the nitrile groups are modified into carboxyl groups and, in the case where the content of the nitrile group in the starting copolymer is high, water-insoluble polymer is formed or an amphoteric polymer predominantly containing anionic groups results and accordingly, it had been difficult to reduce the water content in the dehydrated sludges in the case of its use as a flocculating agent for dehydration.

For overcoming the foregoing drawbacks, as a result of the present inventors' further studies, it has been found that a vinylamine copolymer of high-molecular weight having hydrophobic properties is obtained by partially modifying a vinylformamide copolymer under acidic conditions. Such vinylamine copolymer has an excellent flocculating effect in the treatment of waste water and also has an excellent paper strength increasing effect in the papermaking industry. The present invention has been attained based on the above findings.

SUMMARY OF THE INVENTION

In a first aspect of the present invention, there is provided a vinylamine copolymer having the structural units represented by the following formulas (I), (II), (III)[,](IV) [and (V)]:

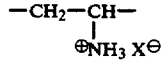
[I]

-continued

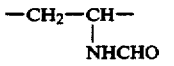

[II]

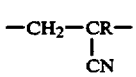

[III]

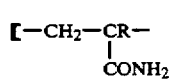

[IV]]

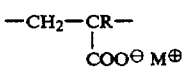

[[V]][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is to 40% by mole, all of said molar fraction being based on the vinylamine copolymer, and the molar fraction of the structural unit (V)] is 0 to 8% by mole which is based on the total content of the structural units (III)[,] *and* (IV) [and (V)]. *The total molar fractions for structural units (I), (II) and (III) is preferably at least 40%, more preferably at least 60%.*

In a second aspect of the present invention, there is provided a flocculating agent comprising a vinylamine copolymer having the structural units represented by the following formulas (I), (II), (III)[,] *and* (IV) [and (V)]:

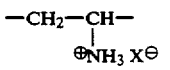

[I]

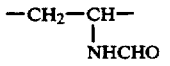

[II]

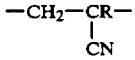

[III]

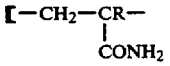

[IV]]

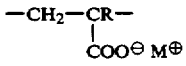

[[V]][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is to 40% by mole, all of said molar fractions being based on the vinylamine copolymer, and the molar fraction of the structural unit (V)] is 0 to 8% by mole which is based on the total content of the structural units (III)[,] *and* (IV) [and (V)]. *The total molar fractions for structural units (I), (II) and (III) is preferably at least 40%, more preferably at least 60%.*

In a third aspect of the present invention, there is provided a paper strength increasing agent comprising a vinylamine copolymer having the structural units represented by the following formulas (I), (II), (III)[,] *and* (IV) [and (V)]:

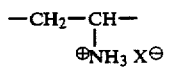

[I]

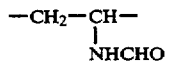

[II]

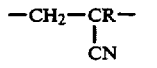

[III]

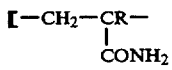

[IV]]

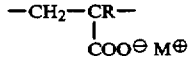

[[V]][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)]. *The total molar fractions for structural units (I), (II) and (III) is preferably at least 40%, more preferably at least 60%.*

In a fourth aspect of the present invention, there is provided a drainage aid for papermaking comprising a vinylamine copolymer having the structural units represented by the following formulas (I), (II), (III)[,] *and* (IV) [and (V)]:

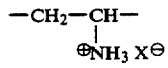

[I]

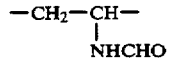

[II]

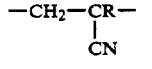

[III]

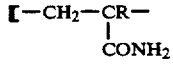

[IV]]

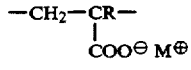

[[V]][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)]. *The total molar fractions for structural units (I), (II) and (III) is preferably at least 40%, more preferably at least 60%.*

In a fifth aspect of the present invention, there is provided a retention aid for papermaking comprising a vinylamine copolymer having the structural units represented by the following formulas (I), (II), (III)[,] *and* (IV) [and (V)]:

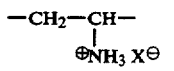
[I]

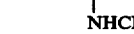
[II]

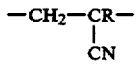
[III]

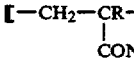
[IV]]

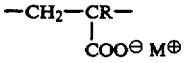
[[V]][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)]. *The total molar fractions for structural units (I), (II) and (III) is preferably at least 40%, more preferably at least 60%.*

In a sixth aspect of the present invention, there is provided a process for producing a vinylamine copolymer having structural units comprising the following formulas (I), (II), (III)[,] *and*(IV) [and (V)]:

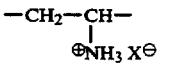
[I]

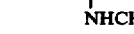
[II]

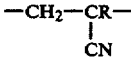
[III]

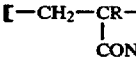
[IV]]

-continued

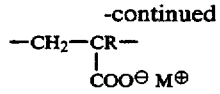
[[V ][*IV*]

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is to 40% by mole, all of said molar fractions being based on the vinylamine copolymer, and the molar fraction of the structural unit (V)] is 0 to 8% by mole which is based on the total content of the structural units (III)[,] *and* (IV) [and (V)], which comprises polymerizing a mixture of N-vinylformamide and a compound of the following general formula (VI)

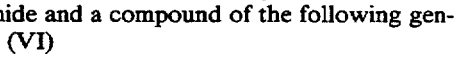
(VI)

(wherein R represents a hydrogen atom or a methyl group) at a molar ratio from 20:80 to 95:5 under the presence of a radical polymerization initiator, and then modifying formyl groups in the resultant polymer under acidic conditions.

DETAILED DESCRIPTION OF THE INVENTION

The vinylamine copolymer according to the present invention has the structural units represented by the formulas (I), (II), (III)[,] *and* (IV) [and (V)]:

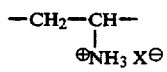
[I]

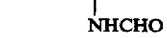
[II]

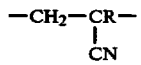
[III]

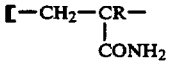
[IV]]

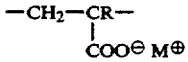
[[V]][*IV*]

(wherein $X^{\ominus}$ represents an anion or hydroxyl ion, R represents a hydrogen atom or a methyl group, $M^{\oplus}$ represents a hydrogen ion or a monovalent cation), in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 8% by mole which is based on the total content of the structural units (III)[,] *and* (IV) [and (V)]. *The total molar fractions for structural units (I), (II) and (III) is preferably at least 40%, more preferably at least 60%.*

A preferred structural unit composition for the copolymer according to the present invention is: from 5 to 85 mol % of the structural unit (I) in the molar fraction, from 2 to 85 mol % of the structural unit (II) in the molar fraction, from 5 to 60 mol % of the structural unit (III) in the molar fraction, [from 0 to 30 mol % of the structural unit (IV) in the molar fraction,] all of said molar fractions being based on the vinylamine copolymer, and from 0 to 5 mol % of the structural unit [(V)] *(IV)* in the molar fraction which is based on the total content of the structural units (III)[,] *and* (IV) [and (V)], and a particularly preferred structural unit composition is: from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)] *(IV)* in the molar fraction which is based on the total content of the structural units (III)[,] *and* (IV) [and (V)]. *The total molar fractions for structural units (I), (II) and (III) is preferably at least 65%, more preferably at least 70%.*

The novel vinylamine copolymer according to the present invention is a water soluble polymer having a reduced viscosity from 0.1 to 10 dl/g, preferably from 0.5 to 10 dl/g measured as a solution thereof prepared by dissolving the copolymer in aqueous 1N sodium chloride solution to a concentration of 0.1 g/dl at a temperature of 25° C.

The novel vinylamine copolymer according to the present invention can be easily obtained by modifying the formyl groups in an N-vinylformamide copolymer under acidic conditions. The N-vinylformamide copolymer used as the starting material is a copolymer prepared by polymerizing a mixture of N-vinylformamide and a compound represented by the following general formula (VI)

$$CH_2=CR-CN \qquad (VI)$$

(wherein R represents a hydrogen atom or a methyl group), that is, acrylonitrile or methacrylonitrile at a molar ratio from 20:80 to 95:5, preferably, from 40:60 to 95:5 and, more preferably, from 40:60 to 90:10, in the presence of a radical polymerization initiator. It is, preferably, a copolymer of N-vinylformamide and acrylonitrile.

As a polymerization method for producing the N-polyvinylamide copolymer, there can be used mass polymerization, solution polymerization or precipitation polymerization using various solvents, and aqueous solution polymerization or the precipitation polymerization which initiates the polymerization by using an aqueous solution of the monomer is preferred. In the case of polymerizing the monomer in the form of an aqueous solution, the monomer concentration, polymerization method and a polymerizing reactor are properly selected in consideration with the molecular weight of an objection polymer and the calorific control from heat of polymerization. The polymerization is conducted, for example, by the following method: (1) a method of polymerizing in a state of solution with a monomer concentration of from 5 to 20% by weight and preparing the polymer as a precipitate, (2) a method of polymerizing in a state of hydrous gel with a monomer concentration of from 20 to 60% by weight and preparing the copolymer as a hydrous gel-like product or precipitate, (3) a method of polymerizing an aqueous solution of the mixture with a monomer concentration of 20 to 60% by weight in a state of an oil-in-water or water-in-oil type emulsion by using a hydrophobic solvent and an emulsifier, and (4) a method of polymerizing an aqueous solution of the mixture with a monomer concentration of 20 to 60% by weight in a state of a water-in-oil type dispersion by using a hydrophobic solvent and a dispersion stabilizer, etc. A particularly preferred polymerization method is precipitation polymerization in water.

As the radical polymerization initiator, there can be used any of the ordinary initiators which are commonly used for the polymerization of water-soluble or hydrophilic monomers. Azo compounds are preferred for producing a polymer in high yield. Particularly preferred are water-soluble azo compounds, for example, hydrochlorides and acetates of 2,2=-azobis-2-amidinopropane; sodium salt of 4,4=-azobis-4-cyanovaleric acid; and hydrochlorides and sulfates of azobis-N,N=-dimethylene isobutylamidine. The amount of the polymerization initiator used is usually within a range from 0.01 to 1% by weight based on the weight of the monomer. Further, the polymerization reaction is usually carried out under an inert gas stream at a temperature from 30° to 100° C.

The thus obtained N-vinylformamide copolymer can be modified in the form it is, in a solution, in a dispersion or in a dilute solution of the polymer or in a powder obtained by dehydrating or drying the polymer in the known method, under acidic conditions, whereby the novel polyvinylamine can be obtained. While on the other hand, in the case where the resultant N-vinylformamide copolymer is subjected to basic hydrolysis in water, nitrile groups in the polymer are substantially eliminated. Particularly, in the case where the content of the nitrile group in the polymer is high, it tends to result in an insoluble polymer or an amphoteric copolymer predominantly containing anionic groups.

As the modification method for the N-vinylformamide copolymer, there can be mentioned, for example, (1) a method of hydrolyzing in water under acidic conditions, (2) a method of hydrolyzing in a hydrophilic solvent such as water-containing alcohol, and (3) a method for subjecting to alcohol-addition degration and modifying formyl groups while separating as an ester of formic acid. As the alcohols in the case of alcohol-addition degration, those alcohols of 1 to 4 carbon atoms can be mentioned and methanol is preferred. The structural unit (V) may partially be converted into esters depending on the case by the alcohol-addition degration, but the effect of the copolymer according to the present invention does not substantially change even when it contains not more than 5 mol % of esters.

As the modifying agent used in the case of the acidic modification, any strongly acidic compounds can be used such as, hydrochloric acid, bromic acid, hydrofluoric acid, sulfuric acid, nitric acid, phosphoric acid, sulfamic acid and alkanesulfonic acid. The amount of the modifying agent used may properly be selected from a range of 0.1 to 2 times to the molar quantity of the formyl groups in the polymer according to the desired rate of modification. The modifying reaction is usually carried out under temperature conditions of from 40 to 100° C., by which a novel vinylamine copolymer containing nitrile groups in the molecules with low carboxyl group content and having preferable water solubility is formed.

The vinylamine copolymer according to the present invention exhibits an excellent effect as a cationic flocculating agent for the treatment of waste water for flocculating organic suspensions, a flocculating agent for the dehydration of organic sludges, etc. Particularly, it exhibits an excellent effect as a dehydrating fluocculating agent for primary settled raw sludges in the treatment of sewage, sludges produced by the activated sludge treatment of water soluble organic materials, the sludges produced in the aerophobic treatment of water soluble organic materials and mixtures thereof. The novel vinylamine copolymer is used in the same manner as in the method of using the conventional cationic flocculating agent, for example, polymers of dimethylaminoethyl methacrylate. That is, the vinylamine copolymer is used in the form of a 0.1–0.5% by weight aqueous solution, and it is added and mixed in an organic sludge-containing suspension in an amount of 20 to 20,000 ppm based on the weight of the suspention.

In the case of using the vinylamine copolymer according to the present invention as a flocculating agent, it is preferred that the vinylamine copolymer is a water soluble polymer having a reduced viscosity of 1 to 10 dl/g measured as a solution thereof prepared by dissolving the copolymer in aqueous 1N sodium chloride solution to a concentration of 0.1 g/dl at a temperature of 25° C. Since the organic sludges subjected to the flocculating treatment by using the vinylamine copolymer according to the present invention are formed more firm and solid flocks than in the case of using a polymer obtained by modifying a homopolymer of N-vinylformamide, the dehydrating speed is improved, the throughput rate is increased and the water content in the dehydrated sludges is reduced by subjecting to machine dehydration such as compression dehydration, centrifuging vacuum filtration etc. by use of a belt press, screw press, filter press, etc.

The vinylamine copolymer according to the present invention can be used also as a cationic water-soluble polymer for the papermaking industry and exhibits an excellent effect in use as a drainage aid, retention aid and paper strength increasing agent. In the case of using the vinylamine copolymer for these applications, a water-soluble polymer having a reduced viscosity of 0.5 to 10 dl/g measured as a solution thereof is prepared by dissolving the copolymer in 1N aqueous sodium chloride solution to a concentration of 0.1 g/dl at a temperature of 25° C.

Also, for using the vlnylamine copolymer as a drainage aid, a retention aid and a paper strength increasing agent, 0 to 8% by mole of the structural unit (V) in the molar fraction based on the total content of the structural units (III) to (V) is preferred. However, the molar fraction of the structural unit is not restricted to the above-mentioned value. The molar fraction of the structural unit (V) of 0 to 20% by mole based on the total content of the structural units (III) to (V) can be adapted. It can be used by any of the known papermaking methods. That is, a cationic polymer of an amount equivalent to 0.05–2% by weight based on the dry weight of pulp is added as a 0.1–5 wt % aqueous solution to a pulp slurry containing 0.5–3 wt % of pulp and then subjected to a papermaking step. Particularly, in the case of using the polymer of the present invention as a paper strength increasing agent, a method of adding it to the pulp slurry as an internal additive to the pulp slurry may be used, or it may be coated onto wet or dry web by a roll coater, size press or dipping machine. If necessary, cationic starch, aluminum sulfate and anionic polyacrylamide may be used jointly with the polymer of the present invention. It can be used with ground pulp, sulfide pulp, craft pulp and beaten wastepaper with no restriction to the type of the pulps.

The cationic polymer is extremely stable in the form of an aqueous solution irrespective of the quality of the solution in which the polymer is dissolved or even if in a diluted aqueous solution. Further, it is stable and does not lose its effect even under weakly alkaline papermaking conditions when using calcium carbonate as a filler. The additive is excellent under neutral or weakly alkaline papermaking conditions.

The novel vinylamine copolymer containing nitrile groups in the molecule according to the present invention contributes much to the field of applying flocculating agents and papermaking additives.

The present invention will now be described in more detail by way of examples, but it should be noted that the invention is in no way limited to the following examples.

Examples (A1–A10) of Preparation of N-Vinylamine Copolymer

Into a 50 ml four-necked flask equipped with a stirrer, a nitrogen introduction tube and a cooling tube, 39.9 g of an aqueous solution containing 4.0 g of a mixture of each of the monomer compositions as shown in Table 1 was charged. After increasing the temperature to 60° C. under stirring in a nitrogen gas stream, 0.12 g of 10 wt % aqueous solution of 2,2=-azobis-2-amidinopropane dihydrochloride was added. The resultant mixture was maintained under stirring at 60° C. for three hours to obtain a suspension in which a polymer was precipitated in water. The remaining monomer in the water was measured by liquid chromatography to calculate the composition of the polymer.

A concentrated hydrochloric acid in an amount equivalent to molar quantity of formyl groups in the polymer was added and maintained under stirring at 75° C. for 8 hours to hydrolyze the polymer. The solution of the resultant polymer was added in acetone to precipitate the polymer, which was dried in vacuum to obtain a solid polymer (hereinafter referred to as polymer A–J).

Each of the compositions of the formed products was determined based on the composition of the copolymer before hydrolysis, the colloidal equivalent value of the product, the atomic ratio for carbon, nitrogen and chlorine based on the elemental analysis, as well as the $^{13}C$-NMR spectrum shown together with the reduced viscosity of the product.

Measurement for the Colloidal Equivalent Amount

Solid polymer was dissolved into distilled water to a concentration of 0.1% by weight. After diluting 5.0 g of the aqueous solution by into 200 ml of desalted water and adjusting pH value of the solution to 3 by using a diluted hydrochloric acid, the colloidal equivalent value was determined by the colloidal titration method by using 1/400 N polyvinyl potassium sulfate and using toluidine blue as an indicator.

Measurement for the Reduced Viscosity

The solid polymer was dissolved in 1N aqueous solution of sodium chloride to a concentration of 0.1 g/dl, and the reduced viscosity at 25° C. was measured by using an Ostwald viscometer.

Reduced viscosity (dl/g)=$(t-t_0)/t_0/0.1$ (wherein $t_0$ represents descending speed of aqueous sodium chloride and t represents descending speed of polymer solution).

TABLE 1

| Example | Monomer composition (mol %) VF[1] | AN[2] | AC[3] |
|---|---|---|---|
| A1 | 90 | 10 | 0 |
| A2 | 75 | 25 | 0 |
| A3 | 60 | 40 | 0 |
| A4 | 60 | 40 | 0 |
| A5 | 50 | 50 | 0 |
| A6 | 40 | 60 | 0 |
| A7 | 40 | 60 | 0 |
| A8 | 50 | 50 | 0 |
| A9 | 50 | 46.5 | 3.5 |
| A10 | 50 | 45 | 5 |

Note:
[1]VF: N-vinylformamide
[2]AN: acrylonitrile
[3]AC: sodium acrylate

TABLE 2

| Example | Polymer | Structural unit of the product (mol %) I | II | III | IV | V | Reduced Viscosity (dl/g) |
|---|---|---|---|---|---|---|---|
| A1 | A | *76* [75] | *14* [15] | *8* [8] | *0* [2] | 0 | 1.9 |
| A2 | B | *67* [64] | *6* [11] | *21* [18] | *0* [7] | 0 | 2.5 |
| A3 | C | *51* [57] | *3* [3] | *32* [25] | *0* [14] | *0* [1] | 3.6 |
| A4 | D | *41* [30] | *16* [30] | *35* [34] | *0* [6] | 0 | 2.0 |
| A5 | E | *40* [33] | *3* [17] | *43* [35] | *0* [14] | *0* [1] | 2.5 |
| A6 | F | *29* [35] | *3* [5] | *54* [30] | *0* [29] | *0* [1] | 3.1 |
| A7 | G | *23* [17] | *11* [23] | *56* [47] | *0* [11] | *0* [2] | 2.5 |
| A8 | H | *22* [46] | *4* [4] | *27* [32] | *0* [16] | *0* [2] | 3.0 |
| A9 | I | *44* [32] | *3* [18] | *40* [33] | *0* [13] | 4 | 2.8 |
| A10 | J | *42* [31] | *3* [19] | *39* [32] | *0* [12] | 6 | 2.9 |

Note:
0.5 eq of hydrochloric acid was used to the formyl groups in the polymer upon modification in Examples A4 and A7. Modifying reaction was carried out at 95° C. in Example A8. X is chlorine ion in the structural unit (I), and R and M are hydrogen atom in the structural units (III) and (V).

Comparative Example of preparation of N-Vinylamine Copolymer

The procedures are the same as those in Example A5 except for using one equivalent of an aqueous 40% sodium hydroxide solution to the formyl groups of the N-vinylformamide copolymer instead of concentrated hydrochloric acid in Example 5. The resultant polymer was a slightly soluble amphoteric copolymer not substantially containing the nitrile groups.

Examples B1–B7 and Comparative Example B8–B10 (Flocculating Properties)

100 ml (2.0% by weight of solid content) of mixed raw sludges obtained from the city sewage treatment plant were put into a 200 ml - polyethylene beaker and 6 ml of an aqueous 0.2 wt. % solution of each of the polymers shown in Table 3 was added thereto. The suspension was agitated by using a stirrer having at its end three rods 5 mm in diameter and 20 mm in length a at a speed of 1000 rpm for 10 sec. The flocculated sludges were charged in a cylinder bottomed with a 60 mesh nylon screen having a diameter of 65 mm and subjected to gravity filtration, and after 10 sec, the amount of the filtrate was measured. Further, a portion of the gravity-filtered sludges was charged in a centrifuging basket having a dish drainer at the bottom and centrifuged at a speed of 3000 rpm for 30 sec for dehydration. The sludges after the dehydration were dried at 110° C. for 6 hours and the solid content were measured to calculate the water content in the sludges after centrifuging dehydration.

While on the other hand, the sludges are gravity-filtered under the same conditions as described above. The sludges after the filtration were put between polyester filter cloths, which were put between polyvinyl chloride plates provided with draining grooves and dehydrated by a hydraulic press having a piston of 20 mm in diameter under the conditions of a piston pressure at 50 kg/cm$^2$ for 30 sec. The sludges after the dehydration were dried at 110° C. for 6 hours and the solid contents were measured to calculate the water contents in the sludges after the press dehydration.

These results are shown collectively in Table 3.

TABLE 3

| Example and Comparative Example | Polymer | Amount of filtrate 10 sec. after the gravity filtration (ml) | Water content of sludges after centrifuging dehydration (wt %) | Water content of sludges after press-dehydration (wt %) |
|---|---|---|---|---|
| B1 | A | 55 | 78.2 | 75.4 |
| B2 | B | 60 | 78.4 | 75.2 |
| B3 | C | 60 | 78.0 | 74.6 |
| B4 | E | 65 | 77.6 | 74.6 |
| B5 | F | 65 | 77.2 | 74.4 |
| B6 | H | 65 | 77.0 | 73.8 |
| B7 | I | 60 | 78.8 | 75.6 |
| B8 | J | 55 | 81.6 | 77.8 |
| B9 | K[1] | 45 | 83.4 | 80.5 |
| B10 | L[2] | not agulated | — | — |

(Note)
[1]Polymer K: Copolymer of 2-methacryloyloxyethyl trimethyl ammonium chloride and acrylamide (molar ratio: 2/8) (reduced viscosity: 10.7 dl/g)
[2]Polymer L: Hydrolyzate of N-vinylamide - ethylene copolymer (molar ratio: 56/44) Modification ratio: 59 mol %, reduced viscosity: 0.2 dl/g Examples C1-C9 and Comparative Example C10 (Paper Strength Increasing Effects)

A 0.6% LBKP slurry having freeness of 400 ml measured by Canadian Standard was present together with calcium carbonate in an amount of 17% based on the pulp, and the mixture was put into a 500 ml-beaker. After adding the chemicals shown below in the form of an aqueous solution under stirring, papers of 60 g of basis weight were made by using a TAPPI Standard square type paper machine, pH value upon paper making being 8.5.

| (Condition of Using Added Chemicals) | | |
|---|---|---|
| | Concentration of aqueous solution (wt %) | Addition amount to pulp dry weight (wt %) |
| Cationic starch | 1.0 | 0.5 |
| Polymers A–G, I and J | 0.5 | 0.5 |
| Sizing agent (alkyl ketene dimer) | 1.0 | 0.2 |
| Filler retention improving agent | 0.1 | 0.02 |

For the comparison, paper was made in the same manner without adding any of the polymers A14 G, I and J among the added chemicals.

The thus obtained wet papers were dried for three minutes by using a drum drier at 120° C. After allowing to stand the resultant papers under the conditions of a temperature of 20° C. and relative humidity of 60%, the specific burst factor and the burst length were measured according to JIS-P 8112 and JIS-P 8113.

$$\text{Specific burst factor} = \frac{S_1}{W} \times 100\ (\text{kg/cm}^2)$$

$$\text{Burst length} = \frac{S_2}{B \times W} \times 1000\ (\text{km})$$

where $S_1$: burst strength (kg/cm$^2$)

W: basis weight of test paper (g/m$^2$)

$S_2$: tensile strength (kg)

B: width of the test piece (mm)

The results are shown in Table 4. 8c

TABLE 4

| Example | Polymer | Specific burst factor (Kg/cm$^2$) | Burst length (Km) |
|---|---|---|---|
| C1 | A | 1.46 | 2.55 |
| C2 | B | 1.47 | 2.54 |
| C3 | C | 1.63 | 2.69 |
| C4 | D | 1.57 | 2.38 |
| C5 | E | 1.39 | 2.44 |
| C6 | F | 1.39 | 2.17 |
| C7 | G | 1.38 | 2.40 |
| C8 | I | 1.42 | 2.38 |
| C9 | J | 1.35 | 2.21 |
| Comparative Example C10 | not added | 1.12 | 1.92 |

Examples C11–C19 and Comparative Example C20 (Paper Strength Increasing Effects)

1% slurry of waste liner boar paper having a freeness of 300 ml measured by Canadian Standard was put into a 500 ml-beaker and an aqueous 0.5 wt. % solution of each of the polymers A–G was added in an amount of 0.3% by weight based on the dry weight of the pulp and then the resultant mixture was maintained for one minute. Papers of basis weight of 120 g were made by using a TAPPI Standard square type paper machine. After treating the thus resultant wet papers in the same procedures as in Example C1, the paper strength of the resultant papers was measured. For the comparison, paper was made in the same procedures as above but without adding any of the polymers and the strength of the resultant paper was measured. The results are shown in Table 5.

TABLE 5

| Example | Polymer | Specific burst factor (Kg/cm$^2$) |
|---|---|---|
| C11 | A | 2.51 |
| C12 | B | 2.71 |
| C13 | C | 2.72 |
| C14 | D | 2.71 |
| C15 | E | 2.86 |
| C16 | F | 2.82 |
| C17 | G | 2.71 |
| C18 | I | 2.76 |
| C19 | J | 2.52 |
| Comparative Example C20 | not added | 2.26 |

Examples D1–D9 and Comparative Example D10 (Drainage Aid Effects for Papermaking)

One liter of 0.3% slurry of LBKP having a freeness of 220 ml measured by Canadian Standard was put into a 2 liter-beaker and each of the polymers A–G, I and J in the form of 0.2 wt. % aqueous solution was added in an amount of 0.2% by weight based on the dry weight of the pulp under stirring. After stirring the mixture at a speed of 200 rpm for one minute, the freeness of each product was measured by using a Canadian Freeness Tester. For the comparison, an experiment was conducted in the same way without adding any of the polymers. The results are shown in Table 6.

TABLE 6

| Example | Polymer | Freeness (ml) |
|---|---|---|
| D1 | A | 270 |
| D2 | B | 260 |
| D3 | C | 300 |
| D4 | D | 285 |
| D5 | E | 285 |
| D6 | F | 255 |
| D7 | G | 250 |
| D8 | I | 280 |
| D9 | J | 260 |
| Comparative Example D10 | not added | 220 |

Examples E1–E9 and Comparative Example E10 (Retention Aid Effects for Papermaking)

One liter of 0.5% LBKP slurry having a freeness of 410 ml measured by Canadian Standard was put into a 2 liter-beaker and 30% by weight of papermaking talc, 0.3% by weight of reinforcing rosin and 4% by weight of aluminum sulfate based on the dry weight of the pulp were respectively added under stirring. Further, after adding an aqueous 0.2 wt. % solution of each of the polymers A–G, I and J in an amount of 0.03% by weight based on the pulp and stirring at a speed of 200 rpm for one minutes, papers of 70 g basis weight were made by the same procedures as in Example C1.

The ash content in the thus obtained resultant papers were measured and the results are shown in Table 7.

For the comparison, paper was made in the same procedures but without adding any of the polymers.

TABLE 7

| Example | Polymer | Ash content (%) |
|---|---|---|
| E1 | A | 15.7 |
| E2 | B | 15.6 |
| E3 | C | 17.1 |
| E4 | D | 18.0 |
| E5 | E | 16.7 |
| E6 | F | 16.5 |
| E7 | G | 15.7 |
| E8 | I | 15.5 |
| E9 | J | 15.0 |
| Comparative Example E10 | not added | 12.7 |

What is claimed is:

1. A vinylamine copolymer having the structural units represented by the following formulas (I), (II), (III)[,] *and* (IV) [and (V)]:

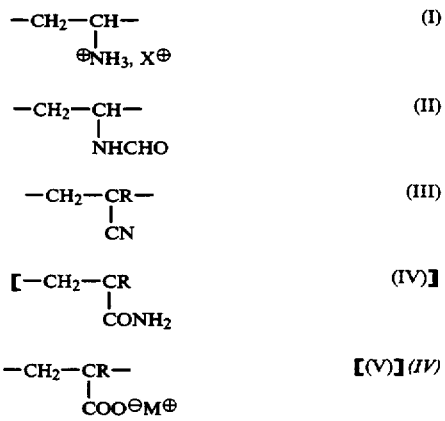

wherein $X^{\ominus}$ represents an anion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 8% by mole which is based on the total content of the structural units (III)[,] *and* (IV) [and (V)] and the total of the molar fractions of the structural units [I–V is equal to 100%] *I–III is at least 60%*;

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

2. A vinylamine copolymer according to claim 1, wherein the reduced viscosity of the vinylamine copolymer is from 0.1 to 10 dl/g measured as a solution thereof prepared by dissolving said copolymer in an aqueous 1N sodium chloride solution to a concentration of 0.1 g/dl at 25° C.

3. A vinylamine copolymer according to claim 1, wherein the composition of said vinylamine copolymer is from 5 to 85 mol % of the structural unit (I) in the molar fraction, from 2 to 85 mol % of the structural unit (II) in the molar fraction, from 5 to 60 mol % of the structural unit (III) in the molar fraction, [from 0 to 30 mol % of the structural unit (IV) in the molar fraction,] all of said molar fractions being based on the vinylamine copolymer, and from 0 to 5 mol % of the structural unit [(V)] *(IV)* in the molar fraction which is based on the total content of the structural units (III)[,] *and* (IV) [and (V)]

4. A vinylamine copolymer according to claim 3, wherein the composition of said vinylamine copolymer is from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)*(IV)* in the molar fraction which is based on the total content of the structural units (III)[,] *and* (IV) [and (V)].

5. A flocculating agent comprising a vinylamine copolymer having the structural units represented by the following formulas (I), (II), (III)[,] *and (IV)* [and (V)]:

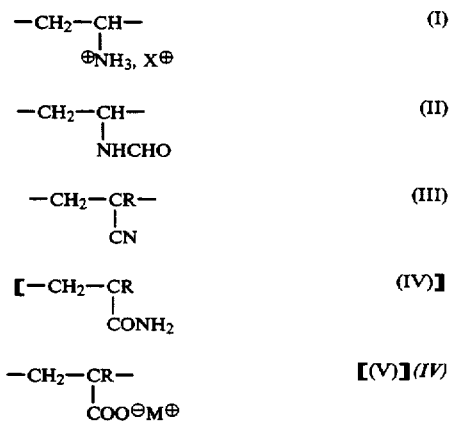

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 8% by mole which is based on the total content of the structural units (III)[,] *and* (IV) [and (V)], and the total of the molar fractions of the structural units [I–V is equal to 100] *I–III is at least 60%*;

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

6. A flocculating agent according to claim 5, wherein the reduced viscosity of the vinylamine copolymer is from 0.1 to 10 dl/g measured as a solution thereof prepared by dissolving said copolymer in an aqueous 1N sodium chloride solution to a concentration of 0.1 g/dl at 25° C.

7. A flocculating agent according to claim 5, wherein the composition of said vinylamine copolymer is from 5 to 85 mol % of the structural unit (I) in the molar fraction, from 2 to 85 mol % of the structural unit (II) in the molar fraction, from 5 to 60 mol % of the structural unit (III) in the molar fraction, [from 0 to 30 mol % of the structural unit (IV) in the molar fraction,] all of said molar fractions being based on the vinylamine copolymer, and from 0 to 5 mol % of the structural unit [(V)] *(IV)* in the molar fraction which is based on the total content of the structural units (III)[,] *and* (IV) [and (V)].

8. A flocculating agent according to claim 7, wherein the composition of said vinylamine copolymer is from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)] *(IV)* in the molar fraction which is based on the total content of the structural units (III)[,] *and* (IV) [and (V)].

9. A paper strength increasing agent comprising of a vinylamine copolymer having the structural units represented by the following formulas (I), (II), (III)[,] *and* (IV) [and (V)]:

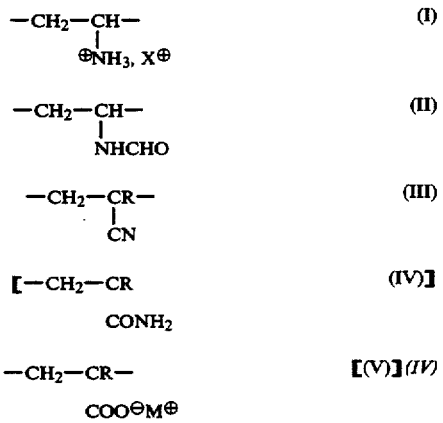

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)], and the total of the molar fractions of the structural units [I–V is equal to 100%] *I–III is at least 60%;*

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

10. A paper strength increasing agent according to claim 9, wherein the reduced viscosity of the vinylamine copolymer is from 0.1 to 10 dl/g measured as a solution thereof prepared by dissolving said copolymer in an aqueous 1N sodium chloride solution to a concentration of 0.1 g/dl at 25° C.

11. A paper strength increasing agent according to claim 9, wherein the composition of said vinylamine copolymer is from 5 to 85 mol % of the structural unit (I) in the molar fraction, from 2 to 85 mol % of the structural unit (II) in the molar fraction, from 5 to 80 mol % of the structural unit (III) in the molar fraction, [from 0 to 40 mol % of the structural unit (IV) in the molar fraction,] all of said molar fractions being based on the vinylamine copolymer, and from 0 to 8 mol % of the structural unit [(V)] *(IV* in the molar fraction which is based on the total content of the structural units (III)[,] *and* (IV) [and (V)].

12. A paper strength increasing agent according to claim 11, wherein the composition of said vinylamine copolymer is from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)] *(IV)* in the molar fraction which is based on the total content of the structural units (III[,] *and* (IV) [and (V)].

13. A drainage aid for papermaking comprising of a vinylamine copolymer having the structural units represented by the following formulas (I), (II), (III)[,] *and* (IV) [and (V)]:

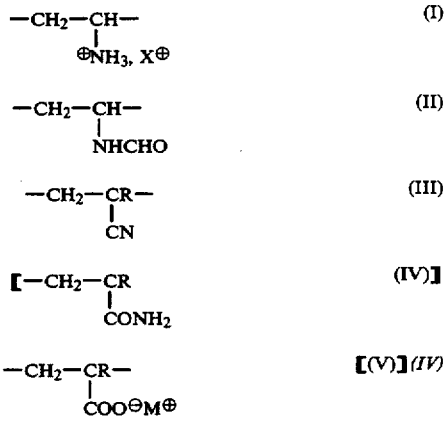

wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)], and the total of the molar fractions of the structural units [I–V is equal to 100%] *I–III is at least 60%;*

*wherein the vinylamine copolymer is prepared by:* polymerizing, in the presence of a radical polymerization initiator, a mixture consisting essentially of *(1) N-vinylformamide and (2) acrylonitrile or methacrylonitrile and*

*hydrolyzing the resultant polymer.*

14. A drainage aid according to claim 13, wherein the reduced viscosity of the vinylamine copolymer is from 0.1 to 10 dl/g measured as a solution thereof prepared by dissolving said copolymer in an aqueous 1N sodium chloride solution to a concentration of 0.1 g/dl at 25° C.

15. A drainage aid according to claim 13, wherein the composition of said vinylamine copolymer is from 5 to 85 mol % of the structural unit (I) in the molar fraction, from 2 to 85 mol % of the structural unit (II) in the molar fraction, from 5 to 80 mol % of the structural unit (III) in the molar fraction, [from 0 to 40 mol % of the structural unit (IV) in the molar fraction,] all of said molar fractions being based on the vinylamine copolymer, and from 0 to 8 mol % of the structural unit [(V)] *(IV)* in the molar fraction which is based on the total content of the structural units (III)[,] *and* (IV) [and (V)].

16. A drainage aid according to claim 15, wherein the composition of said vinylamine copolymer is from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)] *(IV)* in the molar fraction which is based on the total content of the structural units (III)[,] *and* (IV) [and (V)].

17. A retention aid for papermaking comprising of a vinylamine copolymer having the structural units represented by the following formulas (I), (II), (III)[,] *and* (IV) [and (VO]:

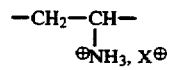
(I)

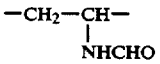
(II)

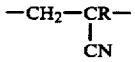
(III)

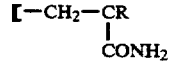
(IV)]

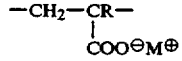
[(V)] *(IV)* wherein $X^{\ominus}$ represents an anion or hydroxyl ion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of the structural unit (IV) [is 0 to 40% by mole, all of said molar fractions being based on the vinylamine copolymer, and the molar fraction of the structural unit (V)] is 0 to 20% by mole which is based on the total content of the structural units (III)[,] *and* (IV) [and (V)], and the total of the molar fractions of the structural units [I–V is equal to 100%] *I–III is at least 60%;*

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

18. A retention aid according to claim 17, wherein the reduced viscosity of the vinylamine copolymer is from 0.1 to 10 dl/g measured as a solution thereof prepared by dissolving said copolymer in an aqueous 1N sodium chloride solution to a concentration of 0.1 g/dl at 25° C.

19. A retention aid according to claim 17, wherein the composition of said vinylamine copolymer is from 5 to 85 mol % of the structural unit (I) in the molar fraction, from 2 to 85 mol % of the structural unit (II) in the molar fraction, from 5 to 80 mol % of the structural unit (III) in the molar fraction, [from 0 to 40 mol % of the structural unit (IV) in the molar fraction,] all of said molar fractions being based on the vinylamine copolymer, and from 0 to 8 mol % of the structural unit [(V)] *(IV)* in the molar fraction which is based on the total content of the structural units (III)[,] *and* (IV) [and (V)].

20. A retention aid according to claim 19, wherein the composition of said vinylamine copolymer is from 5 to 85 mol % of the structural unit (I) in the molar fraction, from 5 to 60 mol % of the structural unit (II) in the molar fraction, from 10 to 60 mol % of the structural unit (III) in the molar fraction, [from 0 to 30 mol % of the structural unit (IV) in the molar fraction,] all of said molar fractions being based on the vinylamine copolymer, and from 0 to 2.5 mol % of the structural unit [(V)] *(IV)* in the molar fraction based on the total content of the structural units (III)[,] *and* (IV) [and (IV)].

*21. A vinylamine copolymer comprising structural units represented by the following formulas:*

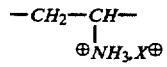
*(A)*

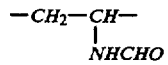
*(B)*

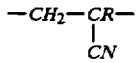
*(C)*

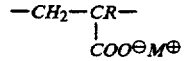
*(D)*

*wherein $X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit*

(D) is 0 to 20% by mole which is based on the total content of the structural units (C) and (D);

wherein the vinylamine copolymer is prepared by:

polymerizing, in the presence of a radical polymerization initiator, a mixture consisting essentially of (1) N-vinylformamide and (2) acrylonitrile or methacrylonitrile and hydrolyzing the resultant polymer.

22. A flocculating agent comprising a vinylamine copolymer comprising structural units represented by the following formulas:

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

$$-CH_2-\underset{COO^{\ominus}M^{\oplus}}{\underset{|}{CR}}- \quad (D)$$

wherein $X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit (D) is 0 to 20% by mole which is based on the total content of the structural units (C) and (D);

wherein the vinylamine copolymer is prepared by:

polymerizing, in the presence of a radical polymerization initiator, a mixture consisting essentially of (1) N-vinylformamide and (2) acrylonitrile or methacrylonitrile and hydrolyzing the resultant polymer.

23. A paper strength increasing agent comprising a vinylamine copolymer comprising structural units represented by the following formulas:

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

$$-CH_2-\underset{COO^{\ominus}M^{\oplus}}{\underset{|}{CR}}- \quad (D)$$

wherein $X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit (D) is 0 to 20% by mole which is based on the total content of the structural units (C) and (D);

wherein the vinylamine copolymer is prepared by:

polymerizing, in the presence of a radical polymerization initiator, a mixture consisting essentially of (1) N-vinylformamide and (2) acrylonitrile or methacrylonitrile and hydrolyzing the resultant polymer.

24. A drainage aid for papermaking comprising a vinylamine copolymer comprising structural units represented by the following formulas:

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

$$-CH_2-\underset{COO^{\ominus}M^{\oplus}}{\underset{|}{CR}}- \quad (D)$$

wherein $X^{\oplus}$ represents an anion, R represents a hydrogen atom or a methyl group, $M^{\ominus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit (D) is 0 to 20% by mole which is based on the total content of the structural units (C) and (D);

wherein the vinylamine copolymer is prepared by:

polymerizing, in the presence of a radical polymerization initiator, a mixture consisting essentially of (1) N-vinylformamide and (2) acrylonitrile or methacrylonitrile and hydrolyzing the resultant polymer.

25. A retention aid for papermaking comprising a vinylamine copolymer comprising structural units represented by the following formulas:

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

$$-CH_2-\underset{COO^{\ominus}M^{\oplus}}{\underset{|}{CR}}- \quad (D)$$

$X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer, and the molar fraction of the structural unit (D) is 0 to

*20% by mole which is based on the total content of the structural units (C) and (D);*

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

*26. A vinylamine copolymer prepared by:*

*polymerizing, in the presence of a radical polymerization initiator, a mixture consisting essentially of (1) N-vinylformamide and (2) acrylonitrile or methacrylonitrile, at a molar ratio of 20:80 to 95:5, respectively; and*

*hydrolyzing the resultant polymer.*

*27. A vinylamine copolymer comprising structural units represented by the following formulas:*

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

*wherein $X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80% by mole, all of said molar fractions being based on the vinylamine copolymer;*

*wherein the vinylamine copolymer is prepared by:*

*polymerizing, in the presence of a radical polymerization initiator, a mixture consisting essentially of (1) N-vinylformamide and (2) acrylonitrile or methacrylonitrile and*

*hydrolyzing the resultant polymer.*

*28. A vinylamine coplymer prepared by polymerizing a mixture comprising (1) N-vinylformamide and (2) acrylonitrile or methacrylonitrile, at a molar ratio of 20:80 to 95:5, respectively, in the presence of a radical polymerization initiator and hydrolyzing the resulting polymer under acidic conditions.*

*29. A vinylamine copolymer prepared by polymerizing a mixture comprising (1) N-vinylformamide and (2) acrylonitrile or methacrylonitrile, at a molar ratio of 20:80 to 95:5, respectively, in the presence of a radical polymerization initiator and hydrolyzing the resulting polymer under acidic conditions until at least part of formyl unit is hydrolyzed to amino unit.*

*30. A vinylamine copolymer comprising structural units represented by the following formulas:*

$$-CH_2-\underset{\oplus NH_3,X^{\oplus}}{\underset{|}{CH}}- \quad (A)$$

$$-CH_2-\underset{NHCHO}{\underset{|}{CH}}- \quad (B)$$

$$-CH_2-\underset{CN}{\underset{|}{CR}}- \quad (C)$$

*wherein $X^{\ominus}$ represents an anion, R represents a hydrogen atom or a methyl group, $M^{\oplus}$ represents a hydrogen ion or a monovalent cation, in which the molar fraction of the structural unit (A) is 5 to 85% by mole, the molar fraction of the structural unit (B) is 2 to 85% by mole, the molar fraction of the structural unit (C) is 5 to 80%* by mole, all of said molar fractions being based on the vinylamine copolymer;

*wherein the vinylamine copolymer is prepared by:*

*polymerizing, in the presence of a radical polymerization initiator, a mixture consisting essentially of (1) N-vinylformamide and (2) acrylonitrile or methacrylonitrile, at a molar ratio of 20:80 to 95:5, respectively; and*

*hydrolyzing the resultant polymer under acidic conditions.*

*31. A vinylamine copolymer having the structural units represented by the following formulas (I), (II), (III) and (IV):*

$$-CH_2-\underset{\oplus NH_3,X^{\oplus}}{\underset{|}{CH}}- \quad (I)$$

$$-CH_2-\underset{NHCHO}{\underset{|}{CH}}- \quad (II)$$

$$-CH_2-\underset{CN}{\underset{|}{CR}}- \quad (III)$$

$$-CH_2-\underset{COO^{\ominus}M^{\oplus}}{\underset{|}{CR}}- \quad (IV)$$

*wherein $X^{\ominus}$ represents an anion, R represents a hydrogen atom or a methyl group, $M^{\oplus}$ represents a hydrogen ion or a monovalent cation, in which the molar fraction of the structural unit (I) is 5 to 85% by mole, the molar fraction of the structural unit (II) is 2 to 85% by mole, the molar fraction of the structural unit (III) is 5 to 80% by mole, the molar fraction of hte structural unit (IV) is 0 to 20% by mole which is based on the total content of the structural units (III) and (IV) and the total of the molar fractions of the structual units I-III is at least 40%;*

*wherein the vinylamine copolymer is prepared by:*

*polymerizing, in the presence of a radical polymerization initiator, a mixture consisting essentially of (1) N-vinylformamide and (2)* acrylonitrile or methacrylonitrile and

*hydrolyzing the resultant polymer.*

* * * * *